(12) United States Patent
Kim et al.

(10) Patent No.: US 10,103,779 B2
(45) Date of Patent: Oct. 16, 2018

(54) ADAPTIVE TONE POWER CONTROL IN PLC NETWORKS

(71) Applicant: Texas Instruments Incorporated, Dallas, TX (US)

(72) Inventors: Il Han Kim, Dallas, TX (US); Anand G. Dabak, Plano, TX (US); Tarkesh Pande, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1129 days.

(21) Appl. No.: 13/644,585

(22) Filed: Oct. 4, 2012

(65) Prior Publication Data

US 2013/0089124 A1 Apr. 11, 2013

Related U.S. Application Data

(60) Provisional application No. 61/544,862, filed on Oct. 7, 2011.

(51) Int. Cl.
*H04L 27/10* (2006.01)
*H04L 27/18* (2006.01)
*H04B 3/54* (2006.01)

(52) U.S. Cl.
CPC ..... *H04B 3/542* (2013.01); *H04B 2203/5408* (2013.01)

(58) Field of Classification Search
CPC combination set(s) only.
See application file for complete search history.

(56) References Cited

U.S. PATENT DOCUMENTS

| 7,031,674 B2 * | 4/2006 | Kataoka | H04W 52/04 370/318 |
| 2008/0057934 A1 * | 3/2008 | Sung | H04W 52/243 455/422.1 |
| 2010/0316140 A1 | 12/2010 | Razazian et al. | |
| 2012/0087229 A1 * | 4/2012 | Mantri | H04W 28/18 370/201 |

* cited by examiner

*Primary Examiner* — Wednel Cadeau
(74) *Attorney, Agent, or Firm* — Gregory J. Albin; Charles A. Brill; Frank D. Cimino

(57) ABSTRACT

In a powerline communications (PLC) network having a first node and at least a second node on a PLC channel utilizing a band including a plurality of tones, based on at least one channel quality indicator (CQI), the first node allocates for a tone map response payload only a single (1) power control bit for each of a plurality of subbands having two or more tones. The power control bit indicates a first power state or a second power state. The first node transmits a frame including the tone map response payload to the second node. The second node transmits a frame having boosted signal power for the tones in the subbands which have the first power state compared to a lower signal power for the tones in the subbands which have the second power state.

16 Claims, 7 Drawing Sheets

| FIELD | BYTE | BIT NUMBER | BITS | DEFINITION |
|---|---|---|---|---|
| TXRES | 0 | 7 | 1 | TX GAIN RESOLUTION CORRESPONDING TO ONE GAIN STEP<br>0:6 dB<br>1:3 dB |
| TXGAIN | 0 | 6-3 | 4 | DESIRED TRANSMITTER GAIN SPECIFYING HOW MANY GAIN STEPS ARE REQUESTED |
| MOD | 0 | 2-1 | 2 | MODULATION TYPE :<br>0-ROBO<br>1-DBPSK<br>2-DQPSK |
| TM[8] | 0 | 0 | 1 | TONE MAP [8] |
| TM[0:7] | 1 | 7-0 | 8 | TONE MAP [7:0] |
| LQI | 2 | 7-0 | 8 | LINK QUALITY INDICATOR |
| TXCOEF[3:0] | 3 | 7-4 | 4 | SPECIFIES NUMBER OF GAIN STEPS REQUESTED FOR 10kHz-20kHz SPECTRUM |
| TXCOEF[7:4] | 3 | 3-0 | 4 | SPECIFIES NUMBER OF GAIN STEPS REQUESTED FOR 20kHz-30kHz SPECTRUM |
| TXCOEF[11:8] | 4 | 7-4 | 4 | SPECIFIES NUMBER OF GAIN STEPS REQUESTED FOR 30kHz-40kHz SPECTRUM |
| TXCOEF[15:12] | 4 | 3-0 | 4 | SPECIFIES NUMBER OF GAIN STEPS REQUESTED FOR 40kHz-50kHz SPECTRUM |
| TXCOEF[19:16] | 5 | 7-4 | 4 | SPECIFIES NUMBER OF GAIN STEPS REQUESTED FOR 50kHz-60kHz SPECTRUM |
| TXCOEF[23:20] | 5 | 3-0 | 4 | SPECIFIES NUMBER OF GAIN STEPS REQUESTED FOR 60kHz-70kHz SPECTRUM |
| TXCOEF[27:24] | 6 | 7-4 | 4 | SPECIFIES NUMBER OF GAIN STEPS REQUESTED FOR 70kHz-80kHz SPECTRUM |
| TXCOEF[31:28] | 6 | 3-0 | 4 | SPECIFIES NUMBER OF GAIN STEPS REQUESTED FOR 80kHz-90kHz SPECTRUM |

FIG. 1B
(PRIOR ART)

| FIELD | BYTE | BIT NUMBER | BITS | DEFINITION |
|---|---|---|---|---|
| TXRES | 0 | 7 | 1 | TX GAIN RESOLUTION CORRESPONDING TO ONE GAIN STEP<br>0:6 db<br>1:3 db |
| TXGAIN | 0 | 6-3 | 4 | DESIRED TRANSMITTER GAIN SPECIFYING HOW MANY GAIN STEPS ARE REQUESTED |
| MOD | 0 | 2-1 | 2 | MODULATION TYPE :<br>00b:ROBO<br>01b:DBPSK<br>10b:DBPSK<br>11b:D8PSK |
| (RESERVED) | 0 | 0 | 1 | (RESERVED) |
| TM[7:0] | 1 | 7 to 0 | 8 | THE TONE MAP PARAMETER DEFINES WHICH FREQUENCY SUB BAND MAY BE USED FOR COMMUNICATIONS WITH THE DEVICE. A BIT SET TO 1 MEANS THAT THE FREQUENCY SUB BAND MAY BE USED; A BIT SET TO 0 MEANS THAT THE FREQUENCY SUB BAND SHALL NOT BE USED.<br><br>TM[7:0]:TONE MAP<br>(b0 IS THE LSB) |
| TM[15:8] | 2 | 7 to 0 | 8 | TM[15:8] TONE MAP |
| TM[23:16] | 3 | 7 to 0 | 8 | TM[23:16] TONE MAP |
| TM[31:24] | 4 | 7 to 0 | 8 | TM[31:24] TONE MAP<br>(b31 IS THE MSB) |
| LQI | 5 | 7-0 | 8 | LINK QUALITY INDICATOR |
| TXCOEF[0] | 6 | 0 | 1 | POWER CONTROL FOR TM[0].<br>TXCOEF[0] == 0 MEANS TONE MAP IS OFF |
| TXCOEF[1] | 6 | 1 | 1 | POWER CONTROL FOR TM[1].<br>TXCOEF[1] == 0 MEANS TONE MAP IS OFF |

| FIELD | BYTE | BIT NUMBER | BITS | DEFINITION |
|---|---|---|---|---|
| TXCOEF[2] | | 2 | 1 | POWER CONTROL FOR TM[2]<br>TXCOEF[2] == 0 MEANS TONE MAP IS OFF |
| TXCOEF[3] | | 3 | 1 | POWER CONTROL FOR TM[3]<br>TXCOEF[3] == 0 MEANS TONE MAP IS OFF |
| TXCOEF[4] | | 4 | 1 | POWER CONTROL FOR TM[4]<br>TXCOEF[4] == 0 MEANS TONE MAP IS OFF |
| TXCOEF[5] | | 5 | 1 | POWER CONTROL FOR TM[5]<br>TXCOEF[5] == 0 MEANS TONE MAP IS OFF |
| TXCOEF[6] | | 6 | 1 | POWER CONTROL FOR TM[6]<br>TXCOEF[6] == 0 MEANS TONE MAP IS OFF |
| TXCOEF[7] | | 7 | 1 | POWER CONTROL FOR TM[7]<br>TXCOEF[7] == 0 MEANS TONE MAP IS OFF |
| TXCOEF[8] | | 0 | 1 | POWER CONTROL FOR TM[8]<br>TXCOEF[8] == 0 MEANS TONE MAP IS OFF |
| TXCOEF[9] | | 1 | 1 | POWER CONTROL FOR TM[9]<br>TXCOEF[9] == 0 MEANS TONE MAP IS OFF |
| TXCOEF[10] | | 2 | 1 | POWER CONTROL FOR TM[10]<br>TXCOEF[10] == 0 MEANS TONE MAP IS OFF |
| TXCOEF[11] | 7 | 3 | 1 | POWER CONTROL FOR TM[11]<br>TXCOEF[11] == 0 MEANS TONE MAP IS OFF |
| TXCOEF[12] | | 4 | 1 | POWER CONTROL FOR TM[12]<br>TXCOEF[12] == 0 MEANS TONE MAP IS OFF |
| TXCOEF[13] | | 5 | 1 | POWER CONTROL FOR TM[13]<br>TXCOEF[13] == 0 MEANS TONE MAP IS OFF |
| TXCOEF[14] | | 6 | 1 | POWER CONTROL FOR TM[14]<br>TXCOEF[14] == 0 MEANS TONE MAP IS OFF |
| TXCOEF[15] | | 7 | 1 | POWER CONTROL FOR TM[15]<br>TXCOEF[15] == 0 MEANS TONE MAP IS OFF |
| TXCOEF[16] | 8 | 0 | 1 | POWER CONTROL FOR TM[16]<br>TXCOEF[16] == 0 MEANS TONE MAP IS OFF |
| TXCOEF[17] | | 1 | 1 | POWER CONTROL FOR TM[17]<br>TXCOEF[17] == 0 MEANS TONE MAP IS OFF |

| FIELD | BYTE | BIT NUMBER | BITS | DEFINITION |
|---|---|---|---|---|
| TXCOEF[18] | | 2 | 1 | POWER CONTROL FOR TM[18]<br>TXCOEF[18] == 0 MEANS TONE MAP IS OFF |
| TXCOEF[19] | | 3 | 1 | POWER CONTROL FOR TM[19]<br>TXCOEF[19] == 0 MEANS TONE MAP IS OFF |
| TXCOEF[20] | | 4 | 1 | POWER CONTROL FOR TM[20]<br>TXCOEF[20] == 0 MEANS TONE MAP IS OFF |
| TXCOEF[21] | | 5 | 1 | POWER CONTROL FOR TM[21]<br>TXCOEF[21] == 0 MEANS TONE MAP IS OFF |
| TXCOEF[22] | | 6 | 1 | POWER CONTROL FOR TM[22]<br>TXCOEF[22] == 0 MEANS TONE MAP IS OFF |
| TXCOEF[23] | | 7 | 1 | POWER CONTROL FOR TM[23]<br>TXCOEF[23] == 0 MEANS TONE MAP IS OFF |
| TXCOEF[24] | | 0 | 1 | POWER CONTROL FOR TM[16]<br>TXCOEF[24] == 0 MEANS TONE MAP IS OFF |
| TXCOEF[25] | | 1 | 1 | POWER CONTROL FOR TM[17]<br>TXCOEF[25] == 0 MEANS TONE MAP IS OFF |
| TXCOEF[26] | | 2 | 1 | POWER CONTROL FOR TM[18]<br>TXCOEF[26] == 0 MEANS TONE MAP IS OFF |
| TXCOEF[27] | 9 | 3 | 1 | POWER CONTROL FOR TM[19]<br>TXCOEF[27] == 0 MEANS TONE MAP IS OFF |
| TXCOEF[28] | | 4 | 1 | POWER CONTROL FOR TM[20]<br>TXCOEF[28] == 0 MEANS TONE MAP IS OFF |
| TXCOEF[29] | | 5 | 1 | POWER CONTROL FOR TM[21]<br>TXCOEF[29] == 0 MEANS TONE MAP IS OFF |
| TXCOEF[30] | | 6 | 1 | POWER CONTROL FOR TM[22]<br>TXCOEF[30] == 0 MEANS TONE MAP IS OFF |
| TXCOEF[31] | | 7 | 1 | POWER CONTROL FOR TM[23]<br>TXCOEF[31] == 0 MEANS TONE MAP IS OFF |

FIG. 2C

ADAPTIVE TONE POWER CONTROL IN PLC NETWORKS

CROSS REFERENCE TO RELATED APPLICATIONS

This application and the subject matter disclosed herein claims the benefit of Provisional Application Ser. No. 61/544,862 entitled "Utilization in Tone Map and TXCOEF" filed Oct. 7, 2011, which is herein incorporated by reference in its entirety.

FIELD

Disclosed embodiments relate generally to the field of powerline communications (PLC) and, more specifically, to methods of using tone maps in PLC networks.

BACKGROUND

PLC is a medium for advanced metering infrastructure (AMI) which allows communication signals to be sent through an existing powerline, so new communication lines are not needed. Current and next generation narrow band PLC are multi-carrier based, such as orthogonal frequency division multiplexing (OFDM)-based in order to obtain high network throughput. OFDM uses multiple orthogonal sub-carriers to transmit data over a plurality of frequency selective channels.

In PLC networks, the system has the ability to communicate in both low voltage (LV) powerlines as well as high voltage power lines. When operating in a high-voltage powerline the system is able to communicate with low-voltage powerlines. This means that the receiver on the LV side must be able to detect the transmitted signal after it has been severely attenuated as a result of going through a medium voltage (MV)/LV transformer. The coupling interface between the PLC device and the MV medium may be referred to as a MV/LV crossing.

In PLC networks that have MV/LV crossings, data transmission over the full FCC allowed frequency band may not be feasible due to network conditions (e.g., noise) so that smaller frequency band portions referred to as tone masks (or simply tones), or groups of tones known as subbands, may be used for each particular MV/LV communication link. A tone map generally refers to an allocation of power for a subband comprising two or more tones.

Since the set of tones that provide effective communications for a particular link may vary link-to-link, and as a function of time, the receiver may not be tuned to the proper set of tones to decode the received frame. When nodes are unable to decode the data payload sent over the tones indicated in the received frame, such as indicated in the PHY header referred to as the frame control header (FCH) in the case of the IEEE P1901.2 standard (IEEE P1901.2), the node will set their virtual carrier sensing (VCS) to the Extended Interframe Space (EIFS) value to account for the largest data payload size transmission allowed in the PLC network.

Multi-Tone Mask (MTM) mode (or "tone masking") refers to the use of multiple tone-masks/subbands to enable nodes in the network to each select individual tones within the band utilized by the network for network communications. When operating in MTM mode, only one/set of TMs may be optimal (typically the lowest noise) for each particular unidirectional/bidirectional link. After each node (device) performs an initial tone mask scanning, the nodes determine which tones are optimal for their UL communications (node to router) and for their DL communications (router to node).

The transmitter networked device may request an estimation of a channel condition by setting a selected bit in the PHY Header. The receiver networked device estimates this particular communication link between two points and chooses optimal PHY parameters. This information is sent back to the transmitter networked device as a tone map response.

Adaptive tone mapping is used to allow the receiver networked device to achieve the greatest possible throughput given the current channel conditions existing between them. To accomplish adaptive tone mapping, the receiver networked device is configured to inform the transmitter networked device which tones it should use to send data bits on, and which tones it should use to send dummy data bits that the receiver networked device will ignore. The receiver networked device may be configured to also inform the transmitter networked device how much amplification (or attenuation) it should apply to each of the tones.

FIG. 1A depicts the structure of a tone map response message frame 100 for adaptive tone mapping for a known G3 PLC network. Frame 100 includes a preamble 101, a frame control header (FCH) 102, and a tone map response data payload 103.

In IEEE P1901.2, the tone map data functions as a specific link control to avoid tones that have a low signal to noise ratio (SNR) to allow use of only "good" tones that have a relatively high SNR. In G3 FCC with a 4.6875 kHz tone spacing, each tone map defines the power level for a subband which has three adjacent tones, where the subbands each span 4.6875 kHz*3=14.0625 kHz. For example, with 72 tones in the G3 FCC band, 24 tone maps for 3 tone subbands are available to utilize.

FIG. 1B shows the tone mask response message description for a receiver networked device utilizing G3-PLC/IEEE P1901.2. TXRES is a parameter that specifies the transmit gain resolution corresponding to one gain step. TXGAIN is a parameter that specifies to the transmitter networked device the total amount of gain that it should apply to its transmitted signal. The value in this parameter specifies the total number of gain steps needed. The receiver networked device computes the received signal level and compares it to a VTARGET (pre-defined desired receive level). The power difference in dB between the two values is mapped to a 5-bit value that specifies the amount of gain increase or decrease that the transmitter network device applies to the next frame to be transmitted. A "0" in the most significant bit indicates a positive gain value, hence an increase in the transmitter gain, and a "1" indicates a negative gain value, hence a decrease in the transmitter gain. A value of TXGAIN="0" informs the transmitter network device to use the same gain value it used for previous frame.

TM is a parameter that specifies the Tone Map. The receiver network device estimates the link quality of the channel with the granularity of the tone map subband and maps each tone map to a one-bit value. A value of "0" indicates to the transmitter network device that dummy data should be transmitted on the corresponding sub carrier while a value of "1" indicates that valid data should be transmitted on the corresponding sub-carrier.

TXCOEF is a parameter that specifies transmitter gain for each 10 kHz section of the available spectrum. The receiver network device measures the frequency-dependent attenuation of the channel and may request the transmitter network device to adjust the transmit power on sections of the spectrum that are experiencing attenuation in order to equalize the received signal. Each 14.0625 kHz section is mapped to a 4-bit value where a "0" in the most significant bit indicates a positive gain value, hence an increase in the transmitter gain is requested for that section, and a "1" indicates a negative gain value, hence a decrease in the transmitter gain is requested for that section.

In the G3-PLC/IEEE P1901.2 standard, there can be seen to be a total of 32 bits used in 8 TXCOEF fields which provide power control data for tone maps. Each TXCOEF field (4 bits) thus defines the power control level for one tone map (and thus its subband having 3 tones).

SUMMARY

Disclosed embodiments recognize for the tone mask response message format for G3-PLC/IEEE P1901.2 (shown in FIG. 1B) there are 8 TXCOEF fields (32 bits/(4 bits/tone map)) possible using 32 bits which each define the power control level for a single tone map (with each tone map defining the power level for a subband having 3 tones). However, 24 tone maps exist in G3 FCC band. Therefore, there are not enough bits available in this standard to represent the 24 tone maps that exist in the G3 FCC band, because to represent 24 tone maps using 4 bits for each tone map, there would need to be total 24*4=96 bits allocated to TXCOEF.

Disclosed embodiments include solutions which provide more efficient use of the bits in the TXCOEF fields of tone mask response message frames to control power for each tone used by the network, including in one particular embodiment methods of using the 32 bits in the TXCOEF fields of a tone mask response message to control power for tones in each of the 24 tone maps that exist in G3 FCC band. Applied to G3-PLC/IEEE P1901.2, instead of using 4 bits for each tone map power control for each tone map as shown in FIG. 1B, as disclosed herein, tone map power is controlled by a single (1) power control bit, where each power control bit defines whether the tone map (which includes 3 tones for G3-PLC/IEEE P1901.2) is in a first power state or a second power state.

Upon receipt of the tone mask response message frame from the first node, the second node transmits a frame having boosted signal power for the tones in the subbands which have the first power state compared to a lower signal power for tones in the subbands that have the second power state. In one embodiment the lower signal power tones are allocated no power (and are thus OFF). Disclosed embodiments can generally be applied to all OFDM-based PLC networks, and will provide advantages for OFDM-based PLC networks which when using their adopted standard lack enough available bits to represent the power in all defined tone maps that exist in network's allowed band.

BRIEF DESCRIPTION OF THE DRAWINGS

Reference will now be made to the accompanying drawings, which are not necessarily drawn to scale, wherein:

FIG. 1B shows the tone mask response message description for a receiver networked device utilizing G3-PLC/IEEE P1901.2.

FIGS. 2A-C show an example tone mask response message description for a receiver networked device utilizing G3-PLC/IEEE P1901.2, according to an example embodiment.

DETAILED DESCRIPTION

Disclosed embodiments now will be described more fully hereinafter with reference to the accompanying drawings. Such embodiments may, however, be embodied in many different forms and should not be construed as limited to the embodiments set forth herein. Rather, these embodiments are provided so that this disclosure will be thorough and complete, and will fully convey the scope of this disclosure to those having ordinary skill in the art. One having ordinary skill in the art may be able to use the various disclosed embodiments and there equivalents. As used herein, the term "couple" or "couples" is intended to mean either an indirect or direct electrical connection, unless qualified as in "communicably coupled" which includes wireless connections. Thus, if a first device couples to a second device, that connection may be through a direct electrical connection, or through an indirect electrical connection via other devices and connections.

Figure 1A:
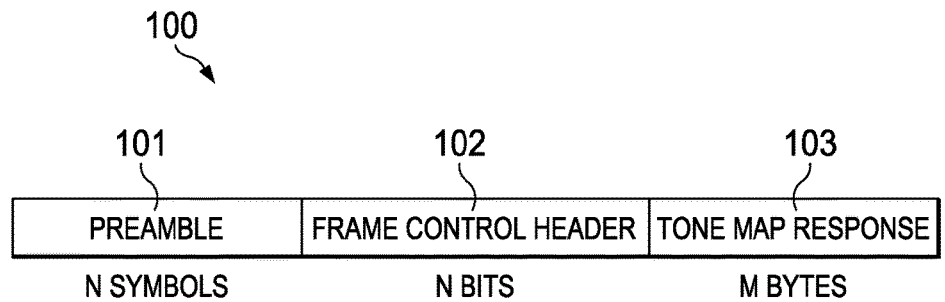
FIG. 1A depicts the structure of a tone map response message frame for adaptive tone mapping for a known G3 PLC network.

For disclosed embodiments, instead of using 4 bits for power control for the tone masks in each tone map in the tone mask response message definitions shown in FIG. 1B, power control for the tones in each tone map is controlled by a single (1) power control bit. Each power control bit defines whether the tone map (which includes 2 or more tones) is in a boosted power state, or is in a lower power state (such as OFF in one embodiment). For example, TXCOEF[0] controls power for tone map [0], shown as TM[0], TXCOEF[1] controls power for TM[1], TXCOEF[2] controls power for TM[2], etc.

The selection of power state for the power control bits are based on at least one channel quality indicator (CQI), including one or more of signal to noise ratio (SNR), bit error rate (BER), frame error rate (FER) and channel capacity. The first power state is an ON state that can be at a predetermined non-zero power level, and the second power state can be an OFF state at a zero power level. In one particular embodiment the predetermined power level is a maximum allowed power level in the PLC network. Alternatively the power level for tones in the ON state can be set by equally transmitting power over the respective transmit subbands.

FIGS. 2A-C show an example tone mask response message format 200 according to an example embodiment, that may be used for G3-PLC/IEEE P1901.2 or another OFDM PLC network. Tone mask response message format 200 may be used with the tone map response message frame 100 for adaptive tone mapping shown in FIG. 1A. Although the respective TXCOEF fields are all shown in FIGS. 2A-C with the bit when set to 0 defined to mean the tone map is "off", as noted above disclosed embodiments need not have the lower power state be an off state.

Figure 3:
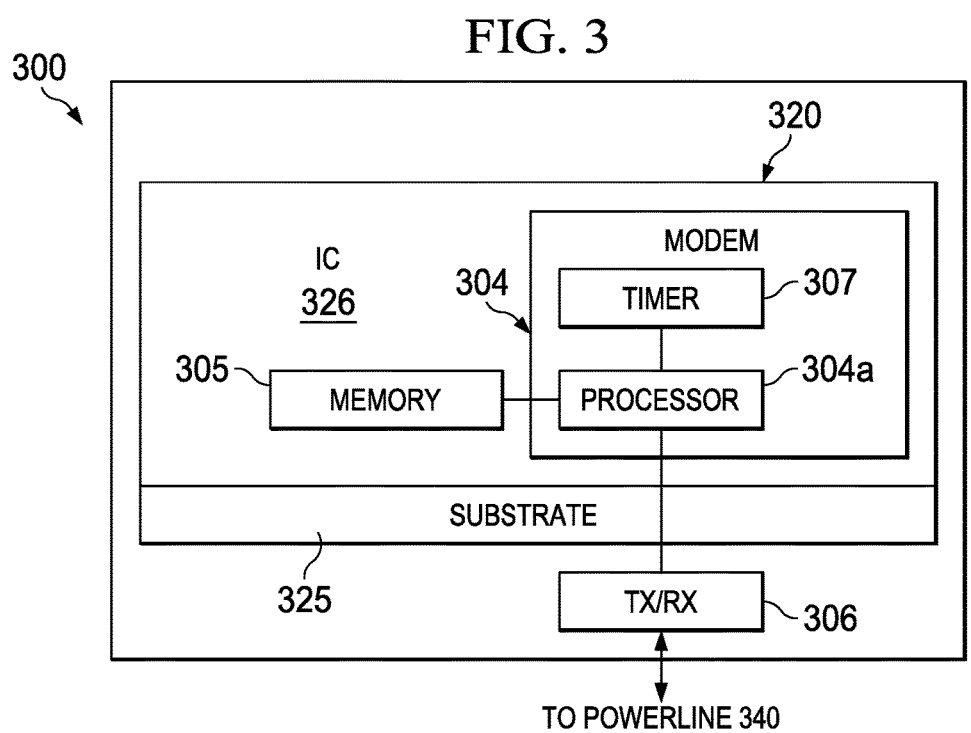
FIG. 3 is a block diagram schematic of a communication device having a disclosed modem that implements adaptive tone power control using a disclosed adaptive power control algorithm, according to an example embodiment.

FIG. 3 is a block diagram schematic of a communication device 300 having a disclosed modem 304 that implements adaptive tone power control using a disclosed adaptive tone power control (ATPC) algorithm, according to an example embodiment. Communication device 300 can be used at a service node (SN, which includes switch nodes and terminal nodes) or at a base node (or data concentrator, BN) in the PLC communications network.

Modem 304 includes a processor (e.g., a digital signal processor, (DSP)) 304a coupled to an associated memory 305 that that stores code for a disclosed ATPC algorithm. Memory 305 comprises non-transitory machine readable storage, for example, static random-access memory (SRAM). In operation, the processor 304a is programmed to implement the ATPC algorithm. Modem 304 includes a timer 307, such as for acknowledgement (ACK) transmission, Carrier Sense Multiple Access/collision avoidance (CSMA)/CA) back-off and data transmission purposes.

The PLC transceiver (TX/RX) 306 is communicably coupled to the modem 304 for coupling of the communication device 300 to the shared powerline 340. Transceiver 306 facilitates communications with other SNs and the BN on the powerline 340.

When the communication device 300 acts as a receiver, the processor 304a is programmed to implement the ATPC algorithm which is operable for compiling a first data frame based on at least one CQI, allocating a tone map response payload using only a single (1) power control bit for each of the subbands each having two or more tones, where the power control bits indicate a first power state or a second power state. The processor 304a also causes the PLC transceiver 306 to transmit frames including the tone map response payload to another node acting as a transmitter on the powerline 340.

When the communication device 300 acts as a transmitter, the ATPC code stored in memory 305 includes code for compiling data frames, decoding the tone map response payload, and for an adaptive transmission power control algorithm. The processor 304a is programmed to implement decoding of a disclosed tone map response payload, and the processor 304a causes the PLC transceiver 306 to transmit frames having boosted signal power for ones of the subbands which have the first power state compared to a lower signal power for tones in subbands that have the second power state to another node acting as a receiver on the powerline 340.

The modem 304 is shown formed on an integrated circuit (IC) 320 comprising a substrate 325 having a semiconductor surface 326, such as a silicon surface. Memory 305 may be included on the IC 320. In another embodiment the modem 304 is implemented using 2 processor chips, such as 2 DSP chips. Besides the DSP noted above, the processor 304a can comprise a desktop computer, laptop computer, cellular phone, smart phone, or an application specific integrated circuit (ASIC).

Disclosed modems 304 and disclosed communications devices 300 can be used in a PLC network to provide a networked device that in service is connected to a powerline via a power cord. In general, the "networked device" can be any equipment that is capable of transmitting and/or receiving information over a powerline. Examples of different types of networked devices include, but are not limited or restricted to a computer, a router, an access point (AP), a wireless meter, a networked appliance, an adapter, or any device supporting connectivity to a wired or wireless network.

Figure 4:
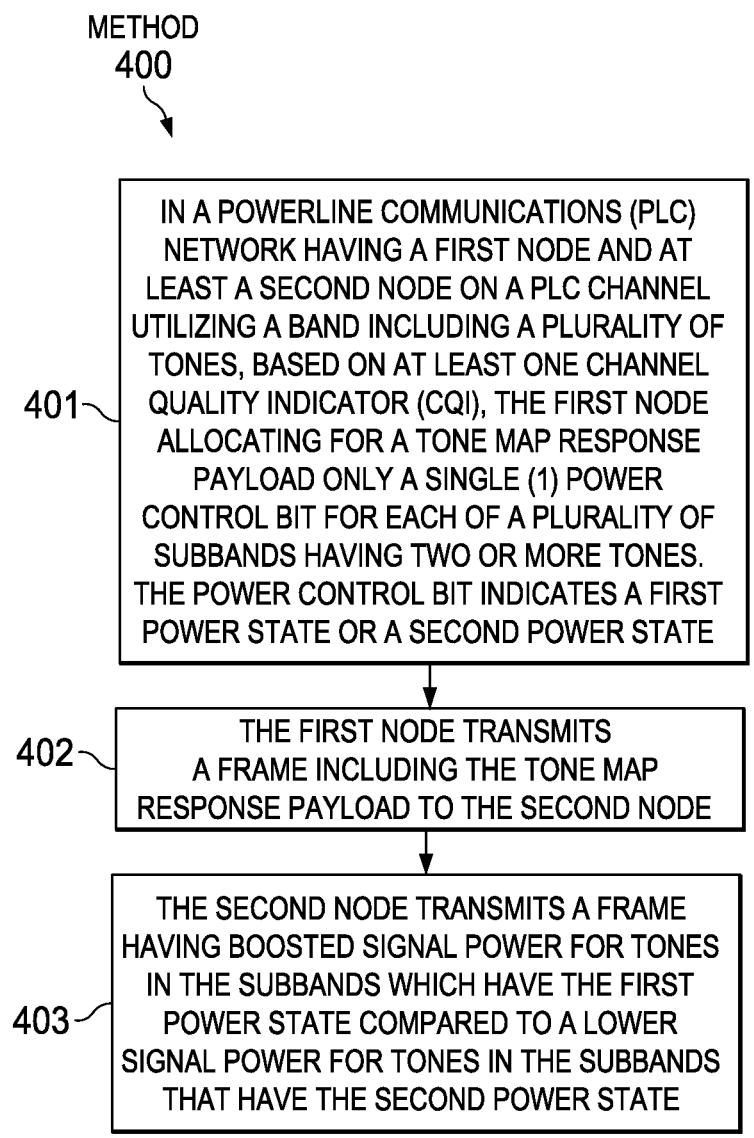
FIG. 4 is a flowchart for an example method for adaptive tone power control for PLC communications, according to an example embodiment.

FIG. 4 is a flowchart for an example method 400 of adaptive tone power control for PLC in a PLC network utilizing a band including a plurality of tones, having a first node and at least a second node on a PLC channel, according to an example embodiment. Step 401 comprises based on at least one CQI, the first node allocating for a tone map response payload only a single (1) power control bit for each of a plurality of subbands having two or more tones, wherein the power control bits indicate a first power state or a second power state. Step 402 comprises the first node transmitting a frame including the tone map response payload to the second node. Step 403 comprises the second node transmitting a frame having boosted signal power for tones in the subbands which have the first power state compared to a lower signal power for tones in the subbands that have the second power state.

Figure 5:
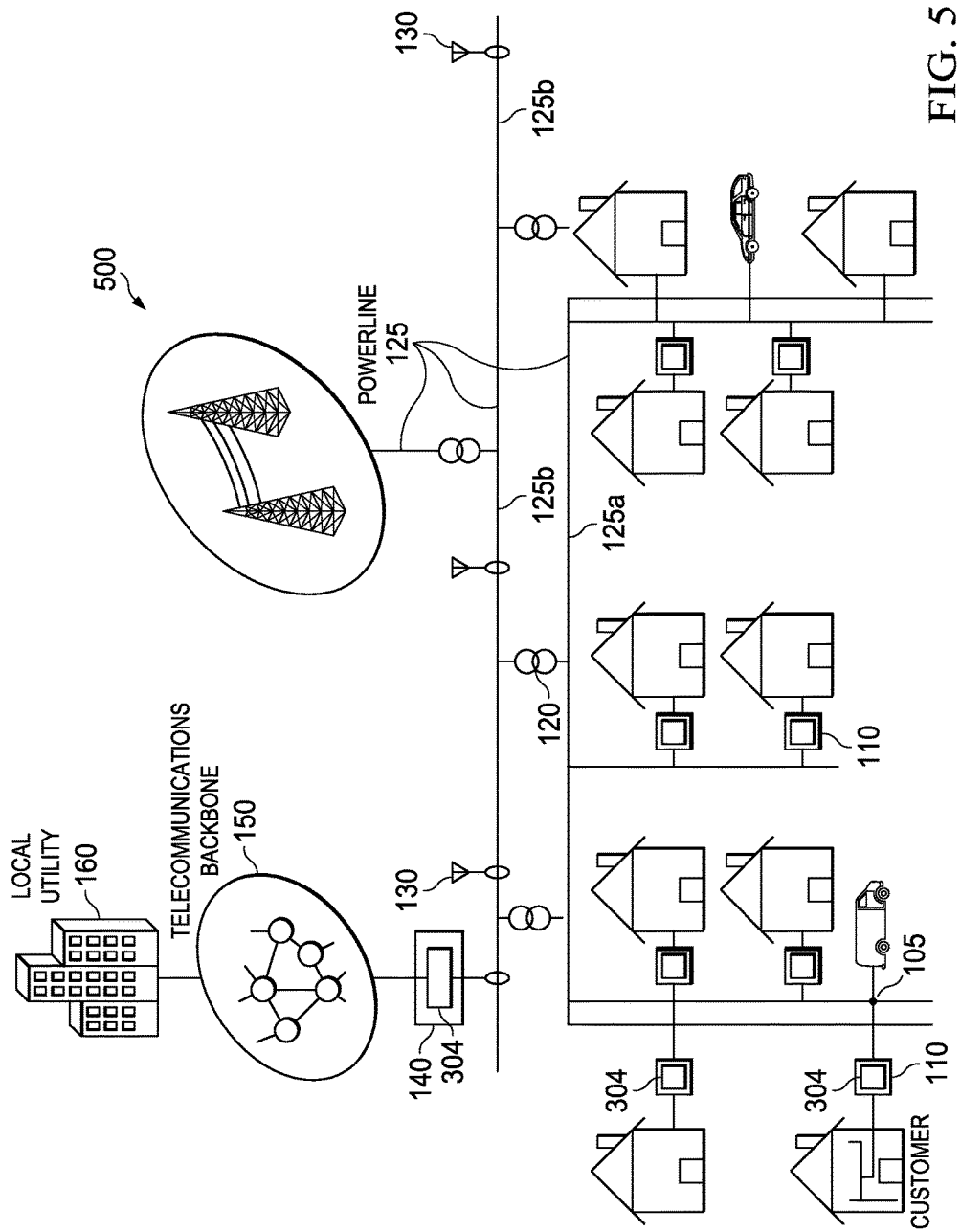
FIG. 5 is a system model depiction of a PLC network for local utility PLC communications, configured for U.S. deployment, that can utilize disclosed embodiments at service nodes and/or base nodes, according to an example embodiment.

FIG. 5 is a system model depiction of a PLC network 500 for local utility PLC communications, configured for U.S. deployment, that can utilize disclosed embodiments at SNs or BNs, according to an example embodiment: LV nodes 105 include meters 110 having disclosed modems 304 that implement adaptive tone power control using a disclosed power control algorithm, which during uplink communications transmit usage and load information ("data") using the low voltage (LV) access network portion 125a of powerline 125 through the transformer 120 over the MV network portion 125b of powerline 125 to one or more medium voltage (MV) routers (also called switch nodes) 130. In turn, each MV router 130 forwards this data to the data concentrator (or base station) 140, which sends the data to the utility company 160 over a telecommunication backbone 150. During downlink communications (router 130 to LV node 105) the direction of communications is reversed relative to uplink communications. Data concentrator (or base station) 140 is also shown including a disclosed modem 304. The UL and DL may have a different optimal TM/sub-band, and thus may be operated using different tones.

The nodes in PLC network 500 in operation have their processors programmed to implement at least one of a receiver ATPC algorithm and a transmitter ATPC algorithm. The receiver ATPC algorithm once implemented by a processor is operable for compiling first data frames, and to use at least one CQI to allocate a tone map response payload using only a single (1) power control bit for each of a plurality of subbands having two or more tones, where the power control bits indicate a first power state or a second power state. The receiver ATPC algorithm causes the PLC transceiver to transmit first frames including the tone map response payload to another node on the powerline 125.

The transmitter ATPC algorithm includes code once implemented by a processor for compiling second data frames, decoding a disclosed tone map response payload, and an adaptive transmission power control algorithm. The transmitter ATPC algorithm causes the PLC transceiver to transmit second frames having boosted signal power for tones in the subbands which have the first power state compared to a lower signal power for tones in the subbands which have the second power state to another node on the powerline 125.

EXAMPLES

Disclosed embodiments are further illustrated by the following specific Examples, which should not be construed as limiting the scope or content of this Disclosure in any way.

It is assumed that the tone map subbands that will be used for transmitting are defined. One of the simplest power allocation algorithms for implementation at a transmitter node is to transmit equal power to a receiver node for all the subbands that are ON and to allocate no power for the subbands that are OFF (as defined in a tone map response payload received from the receiver node) from the total power that is allowed in the PLC network. Upon a change in at least one CQI at some subsequent time, the change in CQI is reflected in a modified tone map response payload received from the receiver node, which defines an updated set of subbands that are ON and OFF. The transmitter may then transmit equal power to the receiver node for the updated set of subbands that are ON and to allocate no power for the updated set of subbands that are OFF.

Many modifications and other embodiments of the invention will come to mind to one skilled in the art to which this Disclosure pertains having the benefit of the teachings presented in the foregoing descriptions, and the associated drawings. Therefore, it is to be understood that embodiments of the invention are not to be limited to the specific embodiments disclosed. Although specific terms are employed herein, they are used in a generic and descriptive sense only and not for purposes of limitation.

We claim:

1. A method of adaptive tone power control in a powerline communications (PLC) network utilizing a band including a plurality of tones, having a first node and at least a second node on a PLC channel, comprising:
   based on at least one channel quality indicator (CQI), said first node allocating for a tone map response payload only a single (1) power control bit for each of a plurality of subbands having two or more of said plurality of tones, wherein said power control bits indicate a first power state or a second power state;
   said first node transmitting a frame including said tone map response payload to said second node, and
   said second node transmitting a frame having boosted signal power for ones of said plurality of tones in said plurality of subbands which have said first power state compared to a lower signal power for ones of said plurality of tones in said plurality of subbands that have said second power state.

2. The method of claim 1, wherein said first power state is an ON state at a predetermined non-zero power level, and said second power state is an OFF state at a zero power level.

3. The method of claim 1, wherein said at least one CQI includes at least one of a signal to noise ratio (SNR), a bit error rate (BER), a frame error rate (FER) and a channel capacity.

4. The method of claim 1, wherein said plurality of subbands each include three of said plurality of tones.

5. The method of claim 2, wherein said predetermined non-zero power level is a maximum allowed power level in said PLC network.

6. A modem for adaptive tone power control on a powerline communications (PLC) network utilizing a plurality of tones, including a first node and at least a second node on a PLC channel, said modem comprising:
   a processor;
   wherein said processor is communicably coupled to a memory which stores an adaptive tone power control (ATPC) algorithm including code for compiling a tone map response message frame including a tone map response payload, and wherein said processor is programmed to implement said ATPC algorithm, said ATPC algorithm:
   based on at least one channel quality indicator (CQI), allocating for said tone map response payload only a single (1) power control bit for each of a plurality of subbands having two or more of said plurality of tones, wherein said power control bits indicate a first power state or a second power state;
   wherein said modem is configured for coupling to a PLC transceiver to provide said tone map response message frame to said PLC transceiver and cause said PLC transceiver to transmit said tone map response message frame over said PLC channel.

7. The modem of claim 6, wherein said ATPC algorithm includes code for decoding said tone map response payload, code for an adaptive transmission power control algorithm and code for compiling second frames, wherein said processor is programmed to implement decoding of said tone map response payload, and wherein said modem is configured to cause said PLC transceiver to transmit said second frames having a boosted signal power for ones of said plurality of tones in said plurality of subbands which have said first power state compared to a lower signal power for tones in said plurality of subbands which have said second power state over said PLC channel.

8. The modem of claim 6, wherein said modem is formed on an integrated circuit (IC) comprising a substrate having a semiconductor surface, wherein said processor comprises a digital signal processor (DSP).

9. The modem of claim 6, wherein said first power state is an ON state at a predetermined non-zero power level, and said second power state is an OFF state at a zero power level.

10. The modem of claim 6, wherein said at least one CQI includes at least one of a signal to noise ratio (SNR), a bit error rate (BER), a frame error rate (FER) and a channel capacity.

11. The modem of claim 6, wherein said modem is part of a communication device which includes said memory and said PLC transceiver.

12. The modem of claim 9, wherein said predetermined non-zero power level is a maximum allowed power level in said PLC network.

13. A powerline communications (PLC) network utilizing a band including a plurality of tones, comprising:
   a first node and at least a second node on a PLC channel;
   said first node including a first memory which stores code for a receiver adaptive tone power control (ATPC) algorithm including code for compiling a first data frame, a first modem coupled to said first memory, said first modem comprising:
   a first processor programmed to implement said receiver ATPC algorithm and said compiling said first data frame, said receiver ATPC algorithm based on at least one channel quality indicator (CQI) allocating a tone map response payload only a single (1) power control bit for each of a plurality of subbands having two or more of said plurality of tones, said power control bits indicating a first power state or a second power state; and
   a first PLC transceiver communicably coupled to said first modem, said receiver ATPC algorithm causing said first PLC transceiver to transmit said first data frame including said tone map response payload to said second node, and
   said second node including a second memory which stores a transmitter ATPC algorithm including code for compiling a second data frame, decoding said tone map response payload, and an adaptive transmission power control algorithm, a second modem coupled to said second memory, said second modem comprising:
   a second processor programmed to implement said decoding of said tone map response payload, and a second PLC transceiver communicably coupled to said second modem, said adaptive transmission power control algorithm causing said second PLC transceiver to transmit said second data frame having boosted signal power for ones of said plurality of tones in said plurality of subbands which have said first power state compared to a lower signal power for ones of said plurality of tones in said plurality of subbands which have said second power state to said first node.

14. The PLC network of claim 13, wherein said first power state is an ON state at a predetermined non-zero power level, and said second power state is an OFF state at a zero power level.

15. The PLC network of claim 13, wherein said predetermined non-zero power level is a maximum allowed power level in said PLC network.

16. The PLC network of claim 13, wherein said at least one CQI includes at least one of a signal to noise ratio (SNR), a bit error rate (BER), a frame error rate (FER) and a channel capacity.

* * * * *